United States Patent Office 3,667,902
Patented June 6, 1972

3,667,902
MANUFACTURE OF SODIUM CARBONATE
Joseph Kay and Ernest Blumenthal, Northwich, England, assignors to Imperial Chemical Industries Limited, London, England
No Drawing. Filed Jan. 12, 1970, Ser. No. 2,371
Claims priority, application Great Britain, Jan. 23, 1969, 3,944/69
Int. Cl. C01d 7/12
U.S. Cl. 23—63
11 Claims

ABSTRACT OF THE DISCLOSURE

A process for the manufacturer of sodium carbonate monohydrate which comprises the step of reacting an aqueous solution of sodium hydroxide with an aqueous suspension of sodium sesquicarbonate at an elevated temperature in the presence of an excess of bicarbonate ions.

---

This invention relates to the manufacture of sodium carbonate and particularly to an improved process whereby sodium carbonate monohydrate is produced in a crystal form such that subsequent calcining yields a dense sodium carbonate possessing desirable physical properties.

One can with advantage use sodium hydroxide solutions from the electrolysis of brine in mercury-cathode cells as a starting point in carbonation processes for the manufacture of sodium carbonate. One can carbonate the solutions with carbon dioxide or with sodium bicarbonate, and it is sometimes particularly advantageous in an alkali-making enterprise to use crude sodium bicarbonate from an ammonia-soda process for this purpose provided the crystal-size and habit of the sodium carbonate monohydrate formed in the carbonation are such that calcination of it produces dense sodium carbonate of the quality demanded commercially. The reaction between sodium hydroxide and sodium bicarbonate to give sodium carbonate is a simple neutralisation, and in the presence of the proper amounts of water the sodium carbonate appears in the form of the monohydrate. This is well-known chemistry and when considered purely as chemistry presents no difficulty. It is however equally well-known in the art that it is difficult to carbonate sodium hydroxide solutions, whether by carbon dioxide or by sodium bicarbonate, and obtain sodium carbonate monohydrate crystals having the size and form that are essential if the sodium carbonate obtained therefrom by calcination is to possess the density, particle-size, particle-size range and hardness that are required for the commercial product.

According to the present invention there is provided a process for the manufacture of sodium carbonate monohydrate which comprises the step of reacting an aqueous solution of sodium hydroxide with an aqueous suspension of sodium sesquicarbonate at an elevated temperature in the presence of bicarbonate ions.

The process of the invention possesses several advantages over known processes for making sodium carbonate monohydrate from sodium hydroxide solutions of which two of the most important are the abilities to control the rate of formation of the monohydrate and to control the shape size of its crystal.

Control of the rate of formation is achieved by the method in which the aqueous solution of sodium hydroxide is added to the aqueous suspension of sodium sesquicarbonate. Since a liquid is being added to a solid/liquid system, it can be arranged for the addition to fall into any desired pattern of tempo and position. For example the liquid can be added in one place in the reaction vessel or, as is advantageous, it can be distributed over the surface of the reaction mass, and at all times the maximum amount of sodium carbonate monohydrate that can be crystallised in any part of the mass is under fine control. This kind of procedure is made possible by the presence of sodium sesquicarbonate, which may be regarded as an intermediate solid product in the conversion of sodium bicarbonate and sodium hydroxide to sodium carbonate monohydrate; it is not possible when the sodium carbonate monohydrate end-product is the only solid phase to appear in the reaction.

The presence of sodium bicarbonate in the medium from which the monohydrate is crystallising has an important effect on the properties of the crystal. Thus if the mother liquor contains some sodium bicarbonate, that is to say sodium hydroxide is absent, the monohydrate crystals produced over a range of supersaturation are sturdy and not too long, they thus filter well and dry well and do not break down on handling and on subsequent calcining yield a dense sodium carbonate having desirable physical properties. On the other hand, if the mother liquor contains sodium hydroxide, and therefore no sodium bicarbonate, thin, weak crystals are obtained that do not filter nor dry well and lead on subsequent calcining to a dense sodium carbonate containing a proportion of fine particles too high for most commercial use.

The process provides a bicarbonate-containing medium during the whole of the time that sodium carbonate monohydrate is crystallising. It is not necessary to feed to the process, during the greater part of its course, the exact quantities of sodium bicarbonate and sodium hydroxide solution required by the stoichiochemistry provided the amount of sodium bicarbonate always slightly exceeds the equivalent amount of sodium hydroxide. This is advantageous because whilst it is easy to maintain a steady feed of sodium hydroxide solution that is not so far crude bicarbonate which tends to cake and has a variable water-content. Complete stoichiometrical equivalence can be achieved near the outlet of the crystalliser by adding there any small amount of sodium hydroxide solution required.

The process is conveniently operated at substantially atmospheric pressure but higher or lower pressures may be used if desired.

The process may be carried out over a wide range of temperature, for example from 60° C. to the boiling point of the aqueous phase. It is preferred, however, to carry out the process at or near the boiling point of the aqueous phase (preferably not more than 10° C. below the boiling point of the aqueous phase). Thus when the process is carried out at substantially atmospheric pressure it is preferred to use a temperature of at least 100° C.

The process may conveniently be carried out using an aqueous suspension of sodium sesquicarbonate produced by reacting an aqueous solution of sodium hydroxide with solid sodium bicarbonate, the proportion of sodium hydroxide used in the said reaction being less than that required to convert all the sodium bicarbonate into sodium carbonate. The amount of sodium hydroxide is preferably 30% to 70% of the weight of sodium hydroxide required to convert all the sodium bicarbonate into sodium carbonate.

Preferably the process comprises a reaction between stoichiometrically equivalent amounts of sodium hydroxide solution and solid sodium bicarbonate in two continuous stages. In the first stage all the sodium bicarbonate is mixed with part of the sodium hydroxide solution to give an aqueous suspension whose solid phase consists mainly of sodium sesquicarbonate but which can also contain other carbonate/bicarbonate complexes, for example that known as Wegscheider's salt $Na_2CO_3 \cdot 3NaHCO_3$ and whose liquid phase consists of a solution mainly of sodium carbonate but also containing a small proportion of sodium bicarbonate. The aqueous suspension then passes to the second stage where the remainder of the sodium hydroxide solution is added and reaction takes place to give sodium carbonate monohydrate.

After separating sodium carbonate monohydrate from the liquid system produced in the second stage, it is preferred to return at least part of the liquid phase to one or both of the reaction stages. The said liquid phase consists substantially of a saturated solution of sodium carbonate; returning part of it to the reaction stages serves to provide a reaction medium and a vehicle to distribute the sodium hydroxide solution added in the stages. It is preferred to add a major proportion, for example at least 70% by weight, of this liquid phase to the second reaction stage.

In a particular form of the invention the caustic soda liquor is the strong solution of sodium hydroxide obtained by the electrolysis of sodium chloride brine in a mercury-cathode cell and contains for example 44–47% by weight of sodium hydroxide, whilst the solid sodium bicarbonate is the damp product from the filter stage of the ammonia-soda process usually described as crude sodium bicarbonate. The amount of sodium hydroxide solution added in the first stage contains preferably 30% to 70% of the weight of sodium hydroxide required to convert all the sodium bicarbonate into sodium carbonate.

In one way of carrying out the process the apparatus comprises a paddle-mixer whose length is conveniently four times its width. About a quarter way along the length is a partition or baffle that divides the mixer into two compartments. All the crude sodium bicarbonate and a quantity of a sodium hydroxide solution containing 45–46% by weight of sodium hydroxide and being at a temperature of above 80° C. are added to the smaller compartment and allowed to react. The quantity of the sodium hydroxide solution is such that it contains a weight of sodium hydroxide equal to 40–60% of that required to convert all the sodium bicarbonate. The aqueous suspension consisting substantially of sodium sesquicarbonate in a mother liquor is allowed to flow into the larger compartment where it receives the remainder of the sodium hydroxide solution required for the conversion through a number of sprays extending over the length of the compartment. The heat of reaction raises the temperature of the system to 100°–103° C. and sodium carbonate monohydrate is formed as the solid phase.

If the sodium carbonate monohydrate when separated is in the form of a mass of multiple crystals it is usually convenient to break these down into single crystals, for example by centrifuging the damp mass.

Sodium carbonate monohydrate as produced in the process according to the present invention may be calcined using conventional methods to give dense sodium carbonate having the desired physical properties required for the commercial product.

The invention is illustrated but not limited by the following example.

EXAMPLE

The process was carried out in a covered paddle-mixer whose length was approximately four times its breadth. The mixer was provided with two paddle shafts extending the length of the mixer, the shafts rotating in the opposite sense and in such directions that the paddles moved upwardly with respect to the centre line of the mixer. The paddles were set parallel to the shafts so that the reaction mass was agitated without being moved substantially backwards or forwards. The mixer was provided with a baffle about one-quarter way along its length thereby dividing the mixer into two compartments. The baffle was provided with a hole which was at a level below the normal level of the aqueous suspension in the mixer, thereby allowing the suspension to pass from the first compartment to the second compartment.

Crude sodium bicarbonate filter cake, obtained in the ammonia-soda process and containing 14% by weight of water, was added through an opening in the cover to one end of the first compartment at the rate of 792 kg./hour. A sodium hydroxide solution at 120° C., obtained by the electrolysis of brine in a mercury-cathode cell and containing 47% by weight sodium hydroxide, was added to the first compartment through coarse sprays at the rate of 170 kg./hour. A saturated solution of sodium carbonate containing about 0.1% of sodium bicarbonate, part of the mother liquor obtained after separating the final sodium carbonate monohydrate product, was also added to the first compartment at the rate of 350 kg./hour.

207 kg./hour of the 47% sodium hydroxide at 120° C. were introduced into the second compartment through coarse sprays extending over two-thirds of the length of the compartment.

The aqueous suspension at the end of the second compartment was allowed to fall through a hole into the boot of a screw-conveyor inclined at an angle of 20° to the horizontal. Most of the solid/liquid separation occurred in the screw-conveyor. The damp solid leaving the conveyor was centrifuged to remove residual liquor and to give sodium carbonate monohydrate having the following size range as determined on British Standard sieves:

| British Standard Sieve Number: | Percent by weight |
|---|---|
| Retained on 16 | 0.2 |
| Through 16 retained on 36 | 7.9 |
| Through 36 retained on 120 | 80.0 |
| Through 120 retained on 240 | 9.1 |
| Through 240 | 2.0 |

After calcining, dense sodium carbonate having the following size range was obtained:

| British Standard Sieve Number: | Percent by weight |
|---|---|
| Retained on 16 | 0.5 |
| Through 16 retained on 32 | 8.5 |
| Through 32 retained on 120 | 79.8 |
| Through 120 retained on 240 | 9.8 |
| Through 240 | 1.4 |

What we claim is:

1. A process for the manufacture of sodium carbonate monohydrate which comprises reacting an aqueous solution of sodium hydroxide and solid sodium bicarbonate by mixing together said sodium bicarbonate and sodium hydroxide solution in a first stage to give an aqueous suspension whose solid phase consists mainly of sodium sesquicarbonate and whose liquid phase consists of a solution mainly of sodium carbonate and a small proportion of sodium bicarbonate, and then, in a second stage, reacting said aqueous suspension with aqueous sodium hydroxide solution at elevated temperature to form said sodium carbonate monohydrate.

2. A process as claimed in claim 1 wherein the second stage reaction is carried out at a temperature of at least 60° C.

3. A process as claimed in claim 2 wherein the reaction is carried out at a temperature not more than 10 degrees centigrade below the boiling point of the aqueous phase of the suspension.

4. A process as claimed in claim 3 wherein the reaction is carried out at a temperature of at least 100° C.

5. A process as claimed in claim 1 wherein the proportion of sodium hydroxide used in the reaction with the solid sodium bicarbonate is from 30 to 70% of that required to convert all the sodium bicarbonate into sodium carbonate.

6. A process as claimed in claim 1 wherein sodium carbonate monohydrate is separated from the reaction product and at least part of the residaul aqueous phase is recycled.

7. A process as claimed in claim 8 wherein at least 70% by weight of the residual aqueous phase is recycled to the stage at which an aqueous solution of sodium hydroxide is reacted with an aqueous suspension of sodium sesquicarbonate.

8. A process as claimed in claim 1 wherein the sodium hydroxide is introduced in the form of an aqueous solution containing from 40% to 50% by weight of sodium hydroxide.

9. A process as claimed in claim 1 wherein the sodium hydroxide is introduced in the form of an aqueous solution obtained by the electrolysis of brine in a mercury-cathode cell.

10. A process as claimed in claim 1 wherein the suspension of sodium sesquicarbonate is the product of reacting an aqueous solution of sodium hydroxide with crude sodium bicarbonate produced by the ammonia-soda process.

11. A process as claimed in claim 1 wherein the sodium carbonate monohydrate is calcined to a dense sodium carbonate.

References Cited
UNITED STATES PATENTS

| | | | |
|---|---|---|---|
| 2,842,489 | 7/1958 | Svanoe | 23—63 X |
| 3,334,963 | 8/1967 | Sisson et al. | 23—63 |
| 3,212,848 | 10/1965 | Tasiaux | 23—63 |
| 3,184,287 | 5/1965 | Gancy | 23—63 |

OSCAR R. VERTIZ, Primary Examiner

G. O. PETERS, Assistant Examiner

U.S. Cl. X.R.

23—65